United States Patent
Wattenbarger

[19]

[11] Patent Number: 5,835,570

[45] Date of Patent: Nov. 10, 1998

[54] VOICE-DIRECTED TELEPHONE DIRECTORY WITH VOICE ACCESS TO DIRECTORY ASSISTANCE

[75] Inventor: Blake L. Wattenbarger, Fair Haven, N.J.

[73] Assignee: AT&T Corp, Middletown, N.J.

[21] Appl. No.: 670,888

[22] Filed: Jun. 26, 1996

[51] Int. Cl.[6] .................................................. H04M 1/64
[52] U.S. Cl. ............................ 379/67; 379/88; 379/213; 379/216
[58] Field of Search ................................. 379/67, 88, 89, 379/213, 216; 704/270, 246, 251

[56] References Cited

U.S. PATENT DOCUMENTS

| | | | |
|---|---|---|---|
| Re. 32,012 | 10/1985 | Pirz et al. | 381/43 |
| 4,348,550 | 9/1982 | Pirz et al. | 381/43 |
| 4,593,157 | 6/1986 | Usdan | 379/67 |
| 4,797,929 | 1/1989 | Gerson et al. | 381/43 |
| 4,922,519 | 5/1990 | Daudelin | 379/67 |
| 4,928,302 | 5/1990 | Kaneuchi et al. | 379/88 |
| 4,979,206 | 12/1990 | Padden et al. | 379/67 |
| 5,014,303 | 5/1991 | Velius | 379/201 |
| 5,165,095 | 11/1992 | Borcherding | 379/88 |
| 5,267,304 | 11/1993 | Slusky | 379/201 |
| 5,325,421 | 6/1994 | Hou et al. | 379/67 |
| 5,339,352 | 8/1994 | Armstrong et al. | 379/213 |
| 5,353,336 | 10/1994 | Hou et al. | 379/67 |
| 5,369,685 | 11/1994 | Kero | 379/67 |
| 5,452,340 | 9/1995 | Engelbeck et al. | 379/65 |
| 5,479,488 | 12/1995 | Lennig et al. | 379/67 |
| 5,504,805 | 4/1996 | Lee | 379/216 |
| 5,509,049 | 4/1996 | Peterson | 379/216 |
| 5,638,425 | 6/1997 | Meador, III et al. | 379/201 |
| 5,644,680 | 7/1997 | Bielby et al. | 704/240 |
| 5,651,056 | 7/1997 | Eting et al. | 679/354 |

OTHER PUBLICATIONS

"Mechanism to Automate Updating Obsolete Telephone Numbers," IBM Technical Disclosure Bulletin, pp. 115–116, Apr. 1994.

*Primary Examiner*—Daniel S. Hunter

[57] ABSTRACT

A voice-directed telephone dialing method and system is provided for automatically accessing a directory assistance service for obtaining a telephone number for a spoken voice label that is not contained within a subscriber's personal telephone list. Upon retrieval of the desired telephone number, the subscriber is prompted for adding the new number to the personal list.

13 Claims, 3 Drawing Sheets

VOICE-DIRECTED TELEPHONE DIRECTORY WITH VOICE ACCESS TO DIRECTORY ASSISTANCE

BACKGROUND OF THE INVENTION

1. Field of the Invention

The present invention relates to the field of telecommunications. More particularly, the present invention relates to voice-directed telephone directory systems used for automatic or repertory dialing.

2. Description of the Related Art

Automatic and repertory dialing systems permit telephone subscribers to access frequently called telephone numbers without manually dialing the telephone numbers which can be an error prone and time consuming process. Automatic and repertory dialing systems are used extensively in business environments where the efficient utilization of telephone communication is economically and professionally important. Further, such dialing systems are appearing in increasing numbers in residential households as consumers purchase new telephone equipment that specifically incorporates automatic dialing capabilities.

Increasingly, automatic and repertory dialing systems incorporate speech recognition techniques that further increase the utility of the dialing systems by, for example, eliminating any manual operation of a telephone apparatus by a user or the user being required to remember frequently called telephone numbers. In conventional voice-dialing systems that incorporate speech recognition, the user must register in advance standard patterns, or voice labels, e.g., key words that are the name of the desired party, that is, a person or business the user wishes to call, for voice recognition and response, as well as telephone numbers that correspond to the standard patterns. When attempting to complete a telephone call, the user speaks the standard pattern as opposed to manually dialing the telephone number. The voice-dialing system then compares the standard pattern (e.g., John Smith) spoken by the user with a listing of previously registered standard patterns. If a match occurs, the system automatically dials the telephone number associated with the standard pattern. Examples of such prior art voice-dialing systems include U.S. Pat. No. 4,928,302 issued to Kaneuchi et al. on May 22, 1990, U.S. Pat. No. 4,797,929 issued to Gerson et al. on Jan. 10, 1989, and U.S. Pat. No. Re. 32,012 reissued to Pirz et al. on Oct. 22, 1985. These conventional systems present problems when a user attempts to complete a call for which no standard pattern has been previously saved. That is, before using any of the conventional voice-dialing systems the user must know the telephone number of the desired party and must teach the voice-dialing system a corresponding standard pattern for recognizing the desired telephone number. The conventional voice dialing systems provide no real time ability to update the system during an attempted call completion, such as accessing a directory assistance service, for example, for obtaining the telephone number and thereafter automatically update the voice-dialing system.

The above-described dialing systems focus on techniques used at the telephone subscriber end of a telephone call, such as a telephone apparatus or private branch exchange (PBX), for providing voice-directed telephone dialing systems. There are also prior art voice-dialing systems incorporated directly into a telecommunication network (e.g., interexchange carrier network) such as those disclosed in U.S. Pat. No. 5,369,685 issued to Kero on Nov. 29, 1994, and U.S. Pat. No. 5,325,421 issued to Hou et al. on Jun. 29, 1994. These particular prior art systems require a user to call a predetermined telephone number for accessing the voice-dialing system embedded in the interexchange carrier network. After accessing the voice-dialing system, the user operates the voice-dialing system through voice input in a conventional manner similar to the subscriber equipment-based voice dialing systems described above. As with the subscriber equipment-based voice-dialing systems, the telecommunication network-based voice-dialing systems also present problems when a user attempts to complete a call for which no standard pattern has been previously saved. That is, there is no real time ability to update the voice-dialing system during the attempted call, such as accessing a directory assistance service, for example, for obtaining the telephone number and thereafter automatically update the voice-dialing system.

U.S. Pat. No. 4,593,157 issued to Usdan on Jun. 3, 1986, discloses a telephone apparatus that includes speech recognition circuitry for capturing on a one-time basis the standardized computer synthesized speech patterns commonly used by a directory assistance service for communicating the requested telephone number to the user. The requested number is captured by the Usdan apparatus and displayed for the user on a numeric display. The user may then request the number to be automatically dialed. Afterwards, the number is erased and not stored for future use.

SUMMARY OF THE INVENTION

The present invention provides a voice-directed telephone dialing system that incorporates voice access to a directory assistance service providing enhanced repertory dialing functionality for users of the system. Specifically, in accordance with an illustrative embodiment, a telephone network-based automatic telephone dialing system provides speech recognition and enables voice access to a directory assistance service that is used by the system for automatically updating a subscriber's repertory dialing directory when a call to a telephone number not registered in the system is initiated by the subscriber.

Advantageously, the present invention eliminates the need for a subscriber to teach the voice-dialing system all of the telephone numbers contained in the system. The subscriber simply speaks the desired name of the party, that is, the person or the destination for call, and the present invention determines whether the telephone number for the desired party is stored in the system. If the number is not available in the system, a connection is made to a directory assistance service, the telephone number is then captured by the system and the directory automatically updated.

The advantages of the present invention are provided by a voice-directed telephone dialing system that includes a memory storing a plurality of voice labels, or key words, that are each associated with a telephone number. The memory is used to create a subscriber's personal telephone list. The system also includes a speech recognition device that recognizes a voice label spoken by the subscriber. A controller is responsive to the speech recognition device by retrieving from the memory the telephone number associated with a spoken voice label and then dialing the number. When the spoken voice label is not one of the voice labels stored in the memory, the controller retrieves from a directory assistance service database the telephone number associated with a party name label corresponding to the spoken voice label. Once the controller has retrieved the desired telephone number from the directory assistance service database, the number is dialed. As a further convenience to a subscriber, the present invention prompts the subscriber for authorization to add the spoken voice label and the associated telephone number retrieved from the directory service database to the personal list stored in the memory.

DETAILED DESCRIPTION

Figure 1:
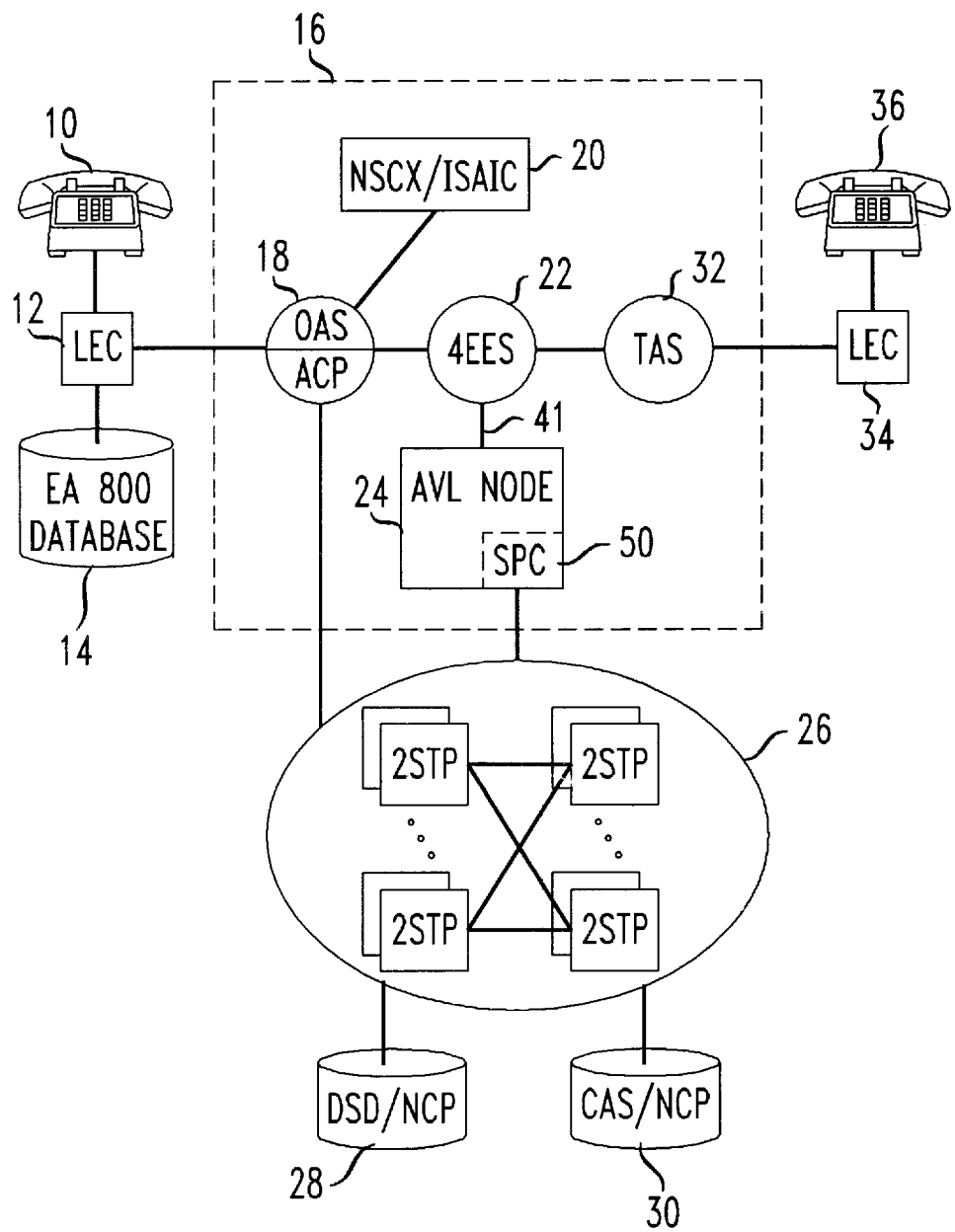
FIG. 1 is a block diagram of a telephone communications system utilizing a voice-directed telephone dialing system according to the present invention.
Figure 3:
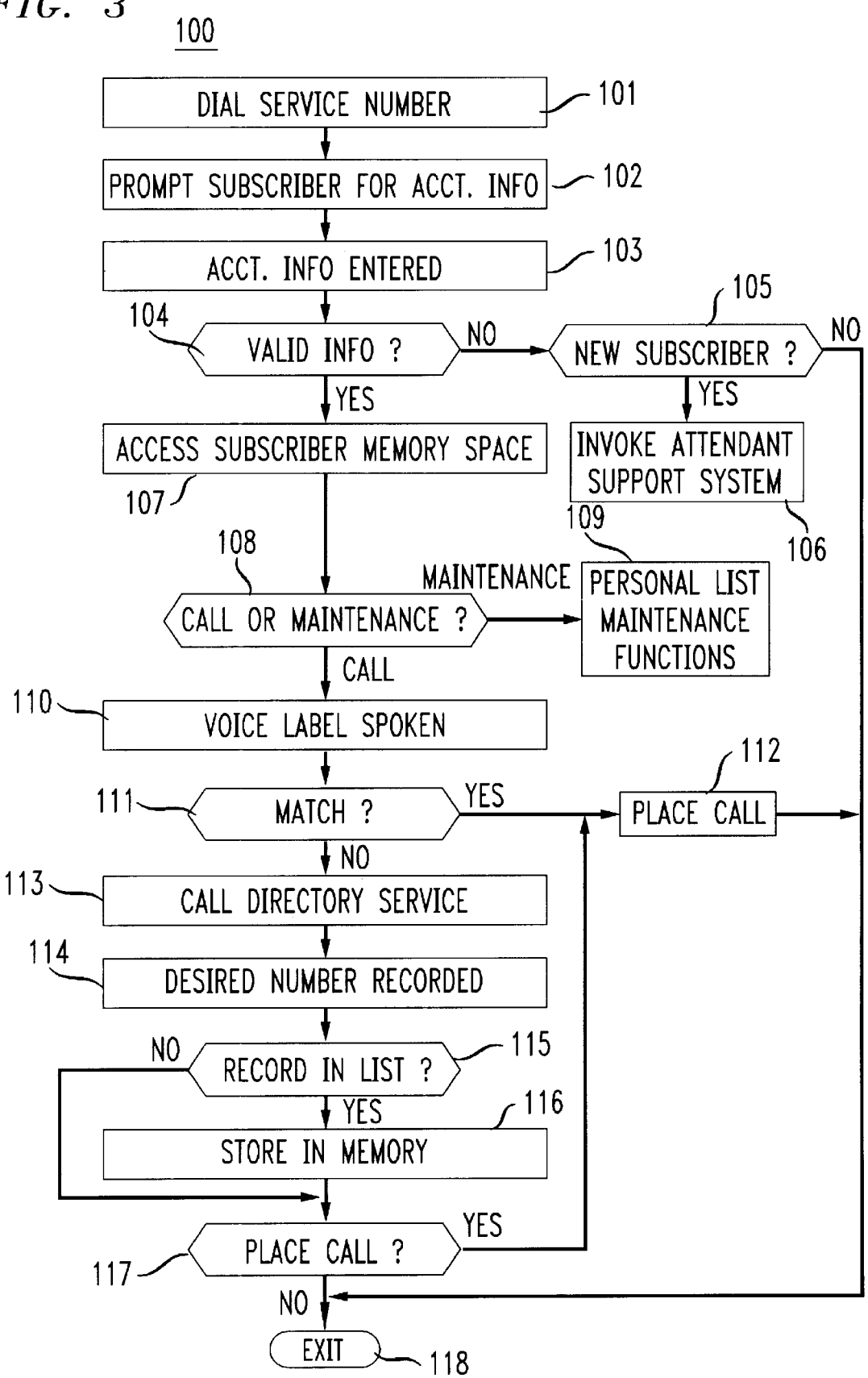
FIG. 3 is a flow chart of the operation of the voice access linkage to a directory assistance in the system of FIG. 1 according to the present invention.

FIG. 1 is a block diagram of a telephone communications system utilizing a network-based voice-directed telephone dialing system according to the present invention. FIG. 3 shows a flow diagram 100 illustrating operation of the present invention. At step 101, a subscriber to the network-based voice dialing service accesses the service by dialing a predetermined telephone number, e.g., 1-800-111-2222, from station set 10. An exemplary network-based voice dialing service is the AT&T VoiceLine Service (AVL) available from AT&T Corp. The AVL service allows subscribers to place an "800" call to an AT&T network-based system enabling the subscriber to call selected telephone numbers by speaking a voice label, e.g., "call John Smith", by dialing a speed dial code, or by dialing the destination number itself. Generally, after the service access number has been dialed by the subscriber, a Local Exchange Company (LEC) 12 (FIG. 1) associates the dialed "800" number with a particular interexchange telecommunications carrier by making a query to an equal access 800 number database 14. After determining the appropriate carrier, LEC 12 extends the call in a conventional manner to a public switched network 16, for example, the AT&T public switched network.

More specifically, LEC 12 routes the call to an AT&T originating switch (OAS) 18 that can also serve as an Action Control Point (ACP). The ACP sends a TCAP query to a Direct Services Dialing/Network Control Point (DSD/NCP) 20 for retrieving certain features associated with the 800 service number. Next, the ACP routes the call to a switch 22 that is one of several switches connected to a telecommunications node 24 (AVL node 24) for providing the network-based voice dialing service. The selection of a particular switch 22 is determined by the dialed 800 number. Switch 22 thereafter establishes a call connection between itself and AVL node 24 thereby extending the original 800 service call dialed by the subscriber. The connection between switch 22 and AVL node 24 is made using a well-known ISDN PRI signaling. The subscriber is now connected directly to the AVL node and may access the AVL service features.

Figure 2:
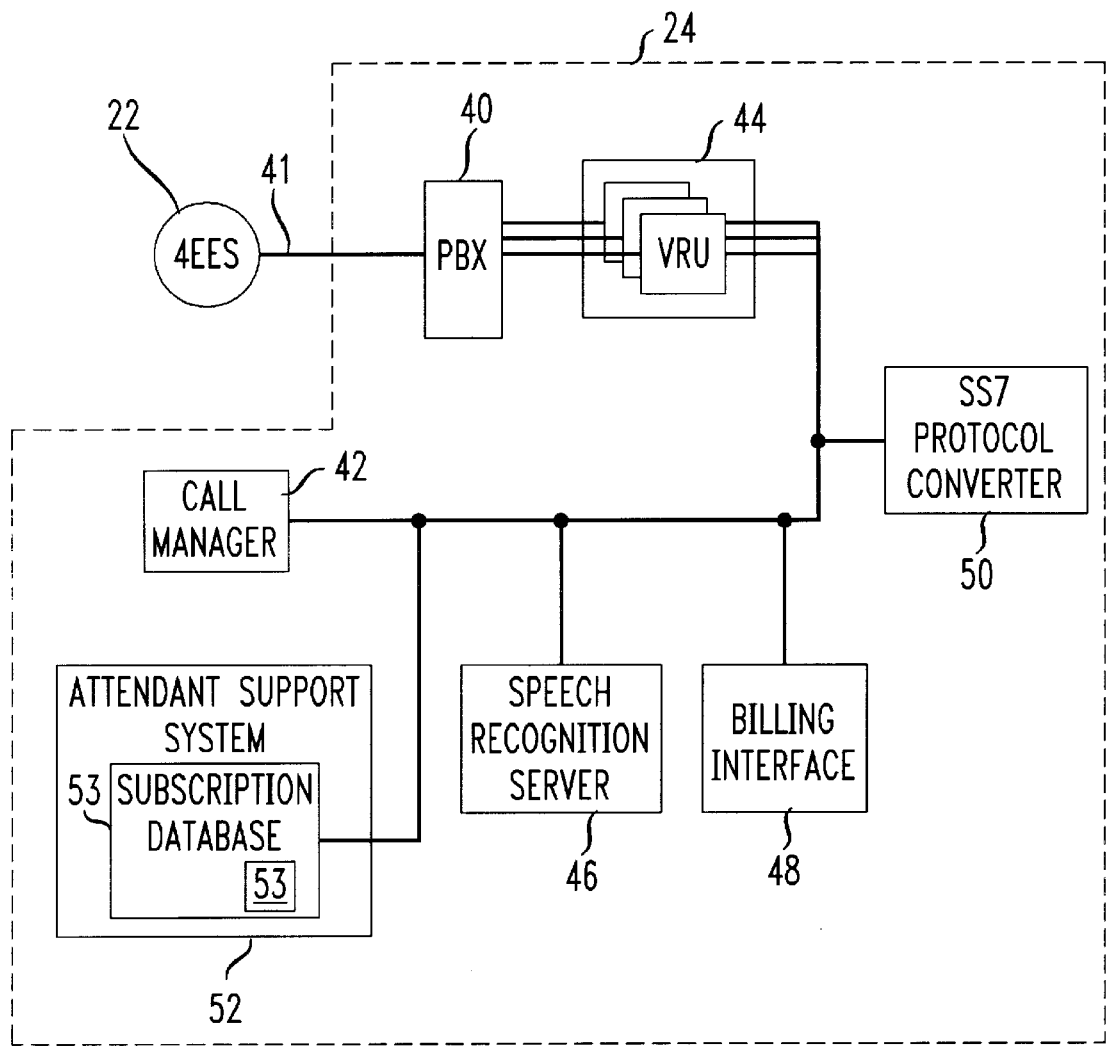
FIG. 2 is a block diagram of a telecommunications node providing network-based voice-dialing and other telephone capabilities according to the present invention.

FIG. 2 is a block diagram depicting an illustrative arrangement of a telecommunications node 24 for providing network-based voice dialing and other telephony capabilities according to the invention. U.S. Pat. No. 5,353,336 issued to Hou et al. on Oct. 4, 1994, discloses an exemplary voice-directed dialing system for telecommunications node 24, and is incorporated by reference herein. The incoming call from switch 22 to AVL node 24 is received at node 24 by switch 40 via trunk 41. In the present illustrative embodiment switch 40 may be, for example, a Summa Four model SDS 1000 switch. Upon call connection to AVL node 24, the call manager 42 acts as a system controller and controls all further processing of the call including resource allocation, call placement and billing record generation through billing interface 48. Before processing any further subscriber requests, AVL node 24 verifies the account number as belonging to an authorized AVL subscriber.

At step 102 in FIG. 3, the subscriber is prompted to enter certain information such as an account number and a personal identification number (PIN) by using a touchtone or dual-tone multi-frequency (DTMF) input, or a spoken input. At step 103, the subscriber enters the requested information. If the account number is invalid at step 104, the system queries whether the caller would like to become a subscriber at step 105, and if so, attendant support system 52 is invoked at step 106 for collecting certain subscriber information.

Once the subscriber has gained access to the AVL system, call manager 42 accesses a memory space 54 in subscription database 53 at step 107 that is allocated to the subscriber containing a plurality of selected voice labels, each having an associated telephone number. The AVL system generates speech signals through one of a plurality of voice response units 44 at step 108 prompting the subscriber for the call destination number, that is, the voice label or standard pattern, the speed dial code or all of the digits of the destination number for the desired party or for personal list maintenance functions. The advantages of the present invention are seen in the case where the subscriber desires to enter the number of the desired party via a spoken voice label at step 110. The ability of AVL node 24 to process spoken voice labels is provided by a speech recognition server 46 that includes the necessary automatic speech recognition routines for processing spoken voice labels or commands in a well-known manner. For this example, the subscriber speaks a voice label, for example, "call John Smith", representing the desired called party. Speech recognition server 46 is invoked for processing the spoken voice label.

At step 111, if the spoken voice label matches a voice label stored in the memory space 54 allocated to the subscriber, AVL 24 places the call at step 112 by sending a TCAP query to SS7 network 26 (FIG. 1) through SS7 protocol converter 50 containing call information, such as, for example, the subscriber number, personal identification number (PIN) and destination for the call. SS7 network 26 routes the query to the appropriate Customer Account Services/National Control Point (CAS/NCP) 30. As a further check for validity of the call, such as, for example, any geographic restrictions placed on the subscriber, SS7 network 26 provides a TCAP response to AVL 24 from CAS/NCP 30 in a well-known manner. If the TCAP response to AVL 24 indicates that the call is valid, AVL 24 attempts to place an outbound call to the desired party at 36 using the destination information supplied by the subscriber as a spoken voice label. The call is routed through terminating switch (TAS) 32 and LEC 34 to the desired party at 36 in a well-known manner.

At step 111, if the spoken voice label does not match a voice label stored in the memory space 54 allocated to the subscriber, AVL 24 calls a directory service database at step 113 by sending a query over SS7 network 26 to a directory service database platform, such as, for example, directory assistance platform 28 (FIG. 1). Directory assistance platform 28 stores a plurality of telephone listings that associate a party name label with a telephone number in a well-known manner. Directory assistance platform 28 responds to the query from AVL 24 with the telephone number for the party name label corresponding to the spoken voice label which is recorded by AVL 24 at step 114. AVL 24 then prompts the subscriber at step 115 for authorization for storing the spoken voice label and the associated telephone number in the subscriber's memory space 24 at step 116. In another embodiment, the subscriber's memory space can also be updated without AVL 24 requesting authorization, depending upon the amount of memory space available and the constraints placed upon personal lists by the particular voice-directed dialing service subscribed to.

Regardless whether the subscriber provides authorization for updating memory space 54 at step 115, AVL 24 queries whether the subscriber wants to place the call at step 117. If so, AVL 24 places the call at step 112 by sending a TCAP query containing the call information to SS7 network 26. SS7 network 26 routes the query to the appropriate Customer Account Services/Network Control Point (CAS/NCP) 30 as a further check for validity of the call. If the TCAP response from CAS/NCP 30 indicates that the call is valid, AVL 24 attempts to place an outbound call to the desired party at 36 using the destination information of the call. The call is routed through TAS 32 and LEC 34 to the desired party at 36 in a well-known manner.

The following example illustrates the situation when the spoken voice label is not contained in the subscriber's personal list in memory space 54. When the subscriber gains access to AVL 24, the subscriber is prompted by one of the plurality of voice response units 44 with "Whom would you like to call?" The subscriber might respond with the voice label "Pete Wilson," for example. Since, for this example, Pete Wilson is not contained in the subscriber's personal list, no match is found and AVL 24 responds, "<Pete Wilson> is not on your list. Would you like Directory Service?", where the voice label appearing within < >is a playback of the recorded utterance of the voice label by the subscriber. For this example, the subscriber replies "Yes". AVL 24 then prompts with "What state, please?" The subscriber responds "California." AVL 24 continues with "What city?" The subscriber replies with "Sacramento." AVL 24 follows with "Please hold."

At this point, the directory services for Sacramento, Calif. is called by AVL 24 and the telephone number for "<Pete Wilson>" is requested from the directory service. If no unique listing were given, the subscriber is connected to a directory service operator for any necessary interaction for identifying the correct Pete Wilson. When the correct listing is found, AVL system 24 captures the telephone number using automatic speech recognition processing for the automatic number report, if necessary, and prompts the subscriber with "Calling <Pete Wilson>. Say 'cancel' to cancel. Do you want to add this listing to your personal list?" For this example, the subscriber says "Yes." AVL 24 then prompts the subscriber to repeat the voice label several times for future voice recognition purposes.

Another advantage of the present invention can be seen in the case where a subscriber has not yet created a personal list in subscription database 53. In this case, the subscriber speaks the voice label of the desired party. Since the personal list does not yet exist, AVL 24 records the spoken voice label in, for example, a portion of speech recognition server 46. AVL 24 then calls directory assistance database 28. Directory assistance database 28 responds to AVL 24 with the telephone number for the party name label corresponding to the recorded spoken voice label. As previously described, AVL 24 records the telephone number and the subscriber is prompted for authorization for storing the spoken voice label and the associated telephone number in a memory space 24 created for the subscriber. At this point, the subscriber can authorize storage of the voice label and telephone number, or simply have the number dialed.

The subscriber can also access the voice-directed dialing system for list maintenance purposes, for example, for adding or deleting voice labels from the personal listing or for modifying the telephone number associated with a particular voice label using well-known techniques.

The foregoing is merely illustrative of the principles of the invention. Those skilled in the art will be able to devise numerous arrangements, which, although not explicitly shown or described herein, nevertheless embody those principles that are within the spirit and scope of the invention.

I claim:

1. A method of dialing a telephone, the method comprising the steps of:

receiving a call at a voice dialing system;

recording a voice label spoken by a caller, the voice label having an associated telephone number;

accessing a database at the voice dialing system for retrieving a telephone number associated with the voice label;

placing a telephone call to a directory service database when the database at the voice dialing system does not contain the telephone number associated with the voice label, the directory service database being different from the database at the voice dialing system;

retrieving the telephone number associated with the voice label from the directory service database; and dialing the retrieved telephone number.

2. The method according to claim 1, further comprising the steps of:

generating speech signals prompting the caller for authorization for storing the telephone number retrieved from the directory service database and the associated voice label spoken by the caller in the database at the voice dialing system; and storing the telephone number retrieved from the directory service database and the voice label spoken by the caller in the database at the voice dialing system when the caller authorizes storing the retrieved telephone number and the associated voice label spoken by the caller.

3. The method according to claim 2, further comprising the step of generating speech signals prompting the caller for the voice label spoken by the caller.

4. The method according to claim 3, wherein the step of dialing the retrieved telephone number includes the steps of:

generating speech signals prompting the caller for authorization for dialing the retrieved telephone number; and dialing the retrieved telephone number when the caller authorizes dialing the retrieved telephone number.

5. A voice-directed telephone dialing system comprising:

a directory service database storing a plurality of telephone listings, each telephone listing including a party name label and a telephone number associated with the party name label;

a memory storing a plurality of selected telephone listings, each selected voice label being a spoken party name label and being associated with a telephone number, the memory being separate from the directory service database;

a speech recording device recording a voice label spoken by a caller, the voice label corresponding to a party name label; and a controller responsive to the speech recording device by retrieving the telephone number associated with the spoken voice label from the memory when the spoken voice label is one of the selected voice labels stored in the memory, and by placing a telephone call to the directory service database when the telephone number associated with the spoken voice label is not stored in the memory and retrieving the telephone number associated with the party name label corresponding to the spoken voice label from the directory service database.

6. The voice-directed telephone dialing system according to claim 5, wherein the controller dials the retrieved telephone number.

7. The voice-directed telephone dialing system according to claim 6, wherein the controller stores the telephone number retrieved from the directory service database and the associated party name label corresponding to the spoken voice label in the memory.

8. The voice-directed telephone dialing system according to claim 6, further comprising a speech generator device responsive to the controller when the telephone number associated with the party name label corresponding to the spoken voice label is retrieved from the directory service database by generating speech signals prompting the caller for authorization for storing the telephone number retrieved from the directory service database and the associated party name label corresponding to the spoken voice label in the memory.

9. The voice-directed telephone dialing system according to claim 8, wherein the directory service database and the memory are coupled through a telecommunications network.

10. A voice-directed telephone dialing system comprising:
 a directory service database platform storing a plurality of telephone listings, each telephone listing including a party name label associated with a telephone number; and
 a voice-directed dialing platform including,
  a speech generator device generating speech signals,
  a memory storing a plurality of selected voice labels and telephone numbers, each selected voice label being a spoken part name label and being associated with a telephone number,
  a controller responsive to a telephone call by controlling the speech generator device to generate speech signals requesting a spoken voice label, and
  a speech recording device recording the spoken voice label,
 the controller being responsive to the speech recording device by retrieving the telephone number associated with the spoken voice label from the memory when the spoken voice label is one of the selected voice labels stored in the memory, and by placing a telephone call to the directory service database platform when the spoken voice label is not one of the selected voice labels stored in the memory,
 the directory service database platform being responsive to the telephone call from the controller and providing the telephone number for the spoken voice label.

11. The voice-directed telephone dialing system according to claim 10, wherein the controller dials the retrieved telephone number.

12. The voice-directed telephone dialing system according to claim 11, wherein the controller stores the retrieved telephone number and the associated party name label corresponding to the spoken voice label in the memory.

13. The voice-directed telephone dialing system according to claim 11, wherein the speech generator device is responsive to the controller when the telephone number associated with the spoken voice label is retrieved from the directory service database platform by generating speech signals prompting the caller for authorization for storing the retrieved telephone number and the associated party name label corresponding to the spoken voice label in the memory.

* * * * *